3,197,475
CERTAIN 2-(O-AMINOPHENYL)-TETRAHYDRO-
BENZOTRIAZOLE COMPOUNDS
Rudolph A. Carboni, Wilmington, Del., assignor to E. I. du Pont de Nemours and Company, Wilmington, Del., a corporation of Delaware
No Drawing. Filed Mar. 12, 1962, Ser. No. 179,200
10 Claims. (Cl. 260—308)

This invention relates to new compositions of matter, to methods of using them, and to certain compositions of matter containing them.

The new compositions of this invention correspond to the formula:

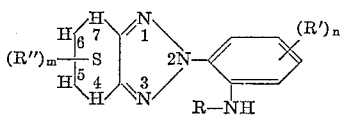

wherein R is hydrogen or an acyl group free of acetylenic unsaturation, i.e., an acyl group in which any unsaturation is ethylenic or aromatic; each of R′ and R″, which can be the same or different, contains less than 19 carbon atoms and is an alkyl group, an alkoxy group, or an electronegative group; R′ can additionally be an alkenylene group which forms an extended aromatic structure of 10–14 ring carbons with the 2-aryl ring; and $m$ and $n$ can be the same or different and are each cardinal numbers of less than 5, i.e., 0, 1, 2, 3, or 4. When $m$ and/or $n$ is less than 4, the respective unsubstituted position(s) on such ring or rings bear(s) hydrogen.

In the above formula, the carbocyclic ring on the left is saturated, i.e., it is cycloaliphatic, while that on the right is benzenoid. Thus, the compounds are referred to as 2 - (o-aminophenyl)-2,1,3-(4,5,6,7-tetrahydrobenzotriazoles) and their monoamides.

Examples of alkyl groups containing less than 19 carbon atoms are ethyl, propyl, hexyl, octyl, decyl, dodecyl, tetradecyl, octadecyl, and the like. Exemplary alkenylene groups are butadienylene and benzbutadienylene. Suitable alkoxy groups include ethoxy, propoxy, butoxy, heptyloxy, decyloxy, tetradecyloxy, octadecyloxy, and the like. Illustrative electronegative groups are halo (chlorine, fluorine, and bromine, i.e., halogen of atomic number 9–35), nitro, sulfo, sulfo alkali metal salts ($SO_3$ alkali metal), cyano, carboxy, and the like.

The term "acyl" is used herein in a generic sense to refer to organic groups formed by removal of the OH group from the acidic moiety of carboxylic, sulfonic, and phosphonic acids, especially those of less than 19 carbons. Thus, the term "acyl group free of acetylenic unsaturation" refers to groups such as the formyl group; carbonyl, sulfonyl and phosphonyl groups, wherein the organic moiety attached to acyl carbon, sulfur or phosphorus, as the case may be, is a hydrocarbon group free of acetylenic unsaturation, e.g., alkyl, alkenyl, cycloalkyl, cycloalkenyl, aryl, alkaryl, aralkenyl and aralkyl, or a substituted hydrocarbon group free of acetylenic unsaturation, e.g., any of the above hydrocarbon groups bearing substituent(s) selected from the group consisting of halogen of atomic number 9–35, nitro, amino, hydroxy, alkoxy, and carboxy (especially carboxy-substituted carbonyls, e.g., any of the above carbonyls wherein the hydrocarbon or substituted-hydrocarbon group bears a carboxy group); and also refers to such groups as alkoxyoxalyl; alkoxycarbonyl alkylene carbonyl, i.e.,

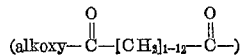

alkoxycarbonyl cyclopentylene or cyclohexylene carbonyl, i.e.,

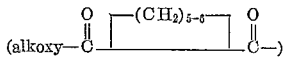

alkoxycarbonyl phenylene carbonyl, i.e.,

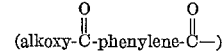

and heterocyclic carbonyl and sulfonyl groups of up to 14 carbons having 4–9 ring carbons and at most one hetero atom which is either oxygen or nitrogen. Also included within the term "acyl group free of acetylenic unsaturation" are those groups formed when one chemical equivalent of a diacylating agent, e.g., a dibasic acid, is reacted with two chemical equivalents of free amine to yield a 2:1 product, i.e., a bis[2-(o-N-monoamidophenyl)-2,1,3-(4,5,6,7-tetrahydrobenzotriazole). Such groups are exemplified by the formulas:

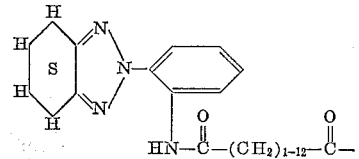

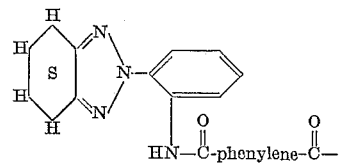

and

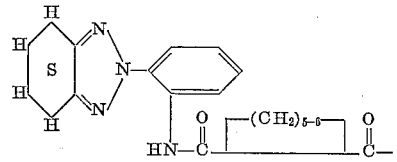

Specific examples of acyl groups are formyl; propionyl, butyroyl, valeroyl, capryloyl, tridecanoyl, octadecanoyl, ethanesulfonyl, butanesulfonyl, decanesulfonyl, tetradecanesulfonyl, methanephosphonyl, butanephosphonyl, methylhexanephosphonyl, and heptanephosphonyl; acryloyl, crotonoyl, methacryloyl, propene-1-sulfonyl, α-ethacryloyl, α-butacryloyl, α-octaacryloyl, and 1-octadecenoyl; cyclobutyroyl, hexahydrobenzoyl, cyclohexanesulfonyl, cyclohexanephosphonyl, and cyclooctanoyl; cyclohexenoyl; benzoyl, benzenesulfonyl, benzenephosphonyl, naphthoyl, and naphthalene sulfonyl; toluoyl, o-butylbenzoyl, o-methylbenzenesulfonyl, toluenephosphonyl, 2,4,6-trimethylbenzoyl, β-methyl- naphthoyl, and α-methylnaphthalene sulfonyl; α-phenacryloyl; phenacetyl, 1-naphthylacetyl and 2-phenylbutyroyl; o-methylhexahydrobenzoyl, 1,4-dibutylhexahydrobenzoyl, and o-methylcyclohexanesulfonyl; and chloroacetyl, 3,4-dibromobutenoyl-1, ω-hydroperfluoropropionyl, perfluorobutanoyl, 2-aminocaproyl, α-bromocaproyl, 2-methyl-4-chlorobenzoyl, 1,6-dibromonaphthoyl, 2-nitropropionyl, p-nitrochlorobenzenesulfonyl, 3,5-dinitrobenzoyl, hydroxyacetyl, ω-hydroxybutyroyl, salicyloyl, m-nitrosalicyloyl, methoxyacetyl, ω-ethoxybutyroyl, and 5-butoxycapryloyl; and malonoyl, succinoyl, adipoyl, phthaloyl, terephthaloyl, o-carboxycyclohexanoyl, monobutoxyadipoyl, monopropoxysuccinoyl, and monodecanoxysuberoyl; and pyridinoyl, pyridinesulfonyl, piperidinoyl, piperidinesulfonyl, α-methylpyridinesulfonyl, and α-butylpiperidinesulfonyl.

The 2-(o-aminophenyl-2,1,3-(4,5,6,7-tetrahydrobenzotriazoles) of this invention, with the exception of the nitro-substituted derivatives (i.e., R′ and/or R″=NO₂), are prepared by the selective, catalytic reduction of the corresponding 2-(o-aminophenyl)-2,1,3-benzotriazoles or dibenzo-1,3a,4,6a-tetraazapentalenes. The nitro derivatives are prepared by nitrating the desired tetrahydrobenzotriazole with a nitrating agent, e.g., nitric acid.

In the catalytic reduction, there can be used any metal known to be active for promoting reduction of the benzene ring. Particularly useful are the noble metals of Group VIII of the Periodic Table. These can be used as free metals, oxides or salts; and they can be unextended or extended on suitable supports, e.g., charcoal, silica, alumina, pumice, kieselguhr, fuller's earth, and the like.

The Group VIII noble metals are platinum, palladium, iridium, osmium, rhodium, and ruthenium.

Palladium-on-charcoal is commercially available, and because of this and its effectiveness under mild conditions of temperature and pressure, it constitutes a preferred catalyst.

An amount of catalyst is chosen that will bring about reaction at the desired rate, and between 0.001 and 10% by weight of the 2-(o-aminophenyl)-2,1,3-benzotriazole or dibenzo-1,3a,4,6a-tetraazapentalene can be used. When it is desired to effect the reaction at a rapid rate and relatively low temperature, an amount between 0.1% and 10% is desirably employed.

The hydrogenation can be carried out at temperatures up to 150° C., depending upon the particular catalyst used. With palladium, however, temperatures in the range of 25° to 125° C. are satisfactory and the hydrogenation is usually conducted at a temperature within this range.

The reaction pressure is not critical, and the hydrogeneration can be carried out at atmospheric pressure. However, superpressures will ordinarily be used to increase the rate of reaction and yield of desired product. Generally there is no advantage in using pressures above 1500 lbs./sq. in. and this, therefore, represents a practical upper limit of pressure.

Although it is not essential, the use of a solvent is advantageous and the hydrogenation is generally conducted in the presence of an inert solvent. Desirably, the solvent is an alkanol, particularly a lower alkanol, such as, methanol; an aliphatic hydrocarbon, such as, isooctane, cyclohexane, and the like; an ether, such as, diethyl ether, dioxane, tetrahydrofuran; or a normally liquid aliphatic acid, such as, acetic, and the like. Mixed solvents such as tetrahydrofuran and acetic acid are also satisfactory.

Hydrogenation of 2-(o-aminophenyl)-2,1,3-benzotriazole or dibenzo-1,3a,4,6a-tetraazapentalene in an organic acid medium, e.g., acetic acid, with a noble metal catalyst, e.g., palladium, may produce the N-acylamine of the 2-(o-aminophenyl)-2,1,3-(4,5,6,7-tetrahydrobenzotriazole). On the other hand, if the hydrogenation is effected in a neutral medium the free amine will be produced.

The tetrahydrobenzotriazoles wherein R is an acyl group, i.e., the N-monoamides, are readily prepared by acylating the amino group of the appropriate benzotriazole prior to reduction, or simultaneously with reduction when either an organic acid or acid anhydride, e.g., acetic acid or acetic anhydride is the acylating agent. Alternatively, acylation can be effected subsequent to reduction in which case, the amino group of the tetrahydrobenzotriazole product is reacted with the acylating agent. In any event, acylation is effected by conventional techniques, e.g., by reacting the free amine group with an acylating agent, preferably in the presence of an acid acceptor, e.g., an alkali metal hydroxide or tertiary amine such as pyridine or triethylamine.

The acylating agents, whether they be carboxylic, sulfonic or phosphonic acids, anhydrides or acid halides, etc., are employed in an equivalent manner to yield the desired monoamide derivative; and therefore, an example of one type of acylating agent, e.g., a carboxylic acid, is equally illustrative of, e.g., the corresponding sulfonic and phosphonic acids.

Specific acylating agents useful in preparing the N-acylamides of the 2-(o-aminophenyl)-2,1,3-(4,5,6,7-tetrahydrobenzotriazoles) are formic, acetic, and propionic acids, acetic anhydride, acryloyl chloride, methacryloyl chloride, anisoyl chloride, acetyl chloride, ω-hydroperfluoropropionyl chloride, perfluorobutanoyl chloride, 2-nitrocaproyl bromide, α-ethylacryloyl bromide, α-butylacryloyl chloride, adipyl chloride, succinoyl bromide, 4-ethoxybutyroyl chloride, benzoic acid, toluoyl chloride, 3-hydroxypropionyl chloride, benzoyl chloride and bromide, p-tert-butyl benzoyl bromide and chloride, 2-methyl-4-chlorobenzoyl chloride, 3,5-dinitrobenzoyl chloride, caproic acid and anhydride, methanesulfonyl chloride, ethanesulfonyl iodide, cyclohexanesulfonyl chloride, butanesulfonyl chloride, o-methylhexahydrobenzoyl chloride, o-nitrohexahydrobenzoyl bromide, 1,2-dicarboxycyclohexane, perfluoroacetyl chloride, monobromodifluoroacetyl chloride, 3,5-dinitrobenzoyl chloride, phthaloyl chloride, terephthaloyl chloride, sorboyl chloride, dodecanoyl chloride, pyridine carboxylic acid, quinoline carboxylic acid, naphthoyl chlorides, β-methylnaphthoyl chloride, octadecanoyl bromide, diethyl oxalate, and the like.

In effecting the N-acylation with monoacylating agents, the acylating agent and amine are used in chemically equivalent amounts. On the other hand, when a diacylating agent is used, two chemically equivalent proportions of the amine are employed for the 2:1 product and one equivalent for the 1:1 product, e.g., a carboxycarbonamide.

The methods of preparing the starting materials that are essential to prepare the products of this invention are illustrated by the following examples.

The 2-(o-aminophenyl)-2,1,3-benzotriazoles are the products obtained in accord with assignee's copending applications, U.S. Serial No. 13,432, filed March 8, 1960, and now abandoned, and U.S. Serial No. 173,806, filed February 16, 1962. These 2-(o-aminophenyl)-2,1,3-benzotriazoles are conveniently made in one of two ways:

(1) By the oxidation of o,o'-diaminoazobenzene in a nitrogen-containing medium, using selected oxidizing agents.

(2) By the reductive ring cleavage with a chemical reducing agent of dibenzo-1,3a,4,6a-tetraazapentalene.

o,o'-Diaminoazobenzene is a known compound and its conversion to 2-(o-aminophenyl)-2,1,3-benzotriazole in a nitrogen-containing medium is illustrated below:

To a solution of 2.2 g. (0.01 mole) of o,o'-diaminoazobenzene in 25 ml. of pyridine there is added gradually 6.4 g. (0.04 mole) of anhydrous cupric sulfate at room temperature with stirring. The mixture is then heated for one hour on a steam bath with stirring, cooled, and poured into four volumes of ice water. The mixture is thereafter extracted with two 150-ml. portions of diethyl ether. The combined extract is decolorized with activated carbon, dried over anhydrous sodium sulfate, and evaporated to dryness. The yellow residual oil obtained solidifies to a crystalline mass on cooling. The solid is collected with the aid of petroleum ether and amounts to 13 g. This product melts at 97° to 98° C. and analyzes:

*Analysis.*—Calcd. for $C_{12}H_{10}N_4$: C, 68.55%; H, 4.79%; N, 26.65%. Found: C, 68.55%; H, 4.98%; N, 26.56%.

The ultraviolet light spectrum shows maxima at 3570 A. ($\epsilon$ 9650), 2960 A. ($\epsilon$ 12,000), 2680 A. ($\epsilon$ 6300), and 2290 A. ($\epsilon$ 20,400).

The infrared spectrum shows bands at $2.98\mu$, $3.10\mu$, and $6.10\mu$ which indicates presence of the $NH_2$ function, and bands at $10.3\mu$, characteristic of a 2-arylbenzotriazole nucleus.

The above data, taken with the fact that diazotization followed by treatment with sodium azide produces 2-(o- azidophenyl)benzotriazole, M.P. 77° to 78° C., confirms that the compound is 2-(o-aminophenyl)-2,1,3-benzotriazole.

The procedure described above is equally applicable to the preparation of substituted 2-(o-aminophenyl)-2,1,3-benzotriazole derivatives. Thus, o-phenylenediamines which contain substituents, such as alkyl, alkoxy, fluorochloro, bromo, sulfo, sulfo alkali metal salt, carboxy, etc., may be oxidized to the corresponding o,o'-diamino-azobenzenes with $PbO_2$. The second oxidation to yield the appropriate benzotriazoles is then carried out as described above., e.g., with cupric sulfate in pyridine or ammonium hydroxide.

Dibenzo-1,3a,4-6a-tetraazapentalene is prepared from o,o'-diazidoazobenzene as described in the co-assigned application for reissue (U.S. Serial No. 115,859, filed June 2, 1961) of U.S. Patent No. 2,904,544, now Re. 25,238, as follows:

To 700 ml. of decalin there is added 8.2 g. of o,o'-diazidoazobenzene, prepared as described subsequently, the mixture is heated to 160° C., and then maintained at 160° to 180° C. for 2.5 hours. The decalin solution is concentrated to 75 ml. under reduced pressure, whereupon long yellow needles of dibenzo-1,3a-4,6a-tetraazapentalene separate, M.P. 237° to 238° C.

The infrared spectrum shows absence of N–H or $-N_3$ functions. The general spectral features are in agreement with the assigned structure.

The ultraviolet spectrum shows three main peaks at 2545 A. ($\epsilon$ 65,500), 3225 A. ($\epsilon$ 4,575), and 4020 A. ($\epsilon$ 40,000). The product analyzes:

*Analysis.*—Calcd. for $C_{12}H_8N_4$: C, 69.22%; H, 3.87%; N, 26.91%; M.W., 208. Found: C, 69.06%; H, 3.99%; N, 26.96%; M.W., 221.

The o,o'-diazidoazobenzene used in the above experiment is prepared as follows:

To a stirred mixture of 4.3 g. (0.02 mole) of o,o'-diaminoazobenzene in 40 ml. of concentrated hydrochloric acid and 40 ml. of water, at 5° C., there is gradually added 4.0 g. (0.058 mole) of sodium nitrite in 20 ml. of water. The insoluble amine hydrochloride gradually dissolves as the diazonium salt forms. The mixture is stirred at 5° C. for an additional hour. Urea is then added to destroy any excess nitrous acid. Sodium azide (3.8 g., 0.06 mole) in 20 ml. of water (5° C.) is slowly added with stirring. Nitrogen is evolved and a colored solid precipitates. The mixture is stirred for 30 minutes at 5° C. and for two hours at room temperature. The solid o,o'-diazidoazobenzene has a melting point, with dec., of 107° to 108° C. and the infrared spectrum is consistent with the assigned structure.

*Analysis.*—Calcd. for $C_{12}H_8N_8$: C, 54.54%; H, 3.05%; N, 42.41%. Found: C, 54.75%; H, 3.31%; N, 42.37%.

The chemical reduction of dibenzo-1,3a,4,6a-tetraazapentalene to 2-(o-aminophenyl)-2,1,3-benzotriazole, is as follows:

To a stirred suspension of 5 g. of lithium aluminum hydride in 75 ml. of tetrahydrofuran there is slowly added a solution of 2.0 g. of dibenzo-1,3a,4,6a-tetraazapentalene in 200 ml. of tetrahydrofuran. The mixture is stirred for one hour without external heating, and then is refluxed for four hours. Excess lithium aluminum hydride and lithium derivatives are decomposed first with alcohol and then with water. The mixture is thereafter extracted with methylene chloride. Evaporation of the extract yields 2-(o-aminophenyl)-2,1,3-benzotriazole, identified by infrared spectral analysis.

As is disclosed in the aforesaid application for reissue, substitution products of dibenzo-1,3a,4,6a-tetraazapentalene are readily prepared by treating the latter with a halogenating or sulfonating reagent, e.g., chlorine or chlorosulfonic acid. Such reagents do not degrade the ring system because it is highly stable. The substituted dibenzo-1,3a,4,6a-tetraazapentalenes are then converted to the corresponding 2-(o-aminophenyl)-2,1,3-(4,5,6,7-tetrahydrobenzotriazoles) by the process described above.

Substituted dibenzo - 1,3a,4,6a-tetraazapentalenes are also prepared from the corresponding substituted o,o'-diaminoazobenzenes, i.e., diaminoazobenzenes which contain substituents such as alkyl, alkoxy, carboxy, fluoro, chloro, bromo, etc. These substituted diaminoazobenzenes can be converted to the corresponding diazides and then to the corresponding substituted dibenzo-1,3a,4,6a-tetraazapentalenes by the procedure described above for the parent (unsubstituted) compound. The latter derivatives may then be converted to the corresponding product of this invention by either procedure described above.

The 2-(o-aminophenyl)-2,1,3-(4,5,6,7 - tetrahydrobenzotriazoles) of this invention in contrast to the parent 2-(o-aminophenyl)-2,1,3-benzotriazoles are colorless and this is a very useful characteristic. This characteristic together with their opacity to actinic light in the ultraviolet region, i.e., in the 1200 to 4000 A. wavelength renders these compounds uniquely useful in protecting light-sensitive or light-fugitive materials against degradation by such light. These compounds have the ability to stabilize not only dye molecules but also polymer molecules, two very dissimilar types of materials.

Synthetic polymers, modified natural polymers, and mixtures of such polymers are widely used in the protective coating, foil wrapping, and textile industries.

Many polymers fail prematurely when exposed intermittently or continuously to actinic light and much effort has been devoted to the solution of this problem. One of the simplest solutions is through incorporation of actinic light-opaque materials.

The compounds of this invention effectively protect polymers against deterioration by actinic light, and thus, are highly valuable photostabilizers. For this purpose up to 10% by weight, and generally from 0.0001 to 5% by weight, of the 2-(o-aminophenyl)-2,1,3-(4,5,6,7-tetrahydrobenzotriazole), or N-acyl derivative, is normally used. The incorporation of these compounds into the polymer is effected by conventional blending procedures.

The examples which follow illustrate but do not limit this invention.

EXAMPLE I

A mixture of 2-(o-aminophenyl)-2,1,3-benzotriazole, 1.3 g., 25 ml. of acetic acid, and 100 mg. of 10% palladium-on-carbon is reacted with hydrogen in a pressure reactor with agitation at room temperature (ca. 22° C.), and 40 lbs./sq. in. pressure for five hours. The theoretical 2 molar equivalents of hydrogen is absorbed during this period. The mixture is filtered to remove the catalyst, the filtrate is subjected to evaporation to remove most of the solvent, the residue is treated with dilute aqueous sodium carbonate solution, and then extracted with diethyl ether. The ether extract is dried, and the ether removed by evaporation. There remains an oily residue that sets to a crystalline mass on cooling. Recrystallization from petroleum ether yields transparent crystals of 2-(o-aminophenyl)-2,1,3-(4,5,6,7-tetrahydrobenzotriazole), M.P. 78–80° C.

*Analysis.*—Calcd. for $C_{12}H_{14}N_4$: C, 67.26%; H, 6.59%; N, 26.15%. Found: C, 67.43%; H, 6.51%; N, 26.06%.

The ultraviolet spectrum shows maxima at 320 m$\mu$ ($\epsilon$ 7200), 269 m$\mu$ ($\epsilon$ 9610), and 238 m$\mu$ ($\epsilon$ 20,500). This spectrum remains essentially unchanged after 80 hours' exposure to the intense light of the Fade-Ometer, indicating its high photostability.

The infrared spectrum shows a doublet in the 3$\mu$ region and a band in the 6$\mu$ region which is associated with the $NH_2$ function. The spectrum shows the saturated $CH_2$ frequencies which are absent from the benzotriazole before hydrogenation.

When Example I is repeated using the trisulfo derivative of 2-(o-aminophenyl)-2,1,3-benzotriazole (i.e., the 2-aryl and the benzo ring carry a total of three sulfo groups), the corresponding trisulfo-substituted 2-(o- aminophenyl)-2,1,3-(4,5,6,7-tetrahydrobenzotriazole) is obtained.

Similarly, when the above example is repeated using the dibromo derivative of 2-(o-aminophenyl)-2,1,3-benzotriazole, the corresponding dibromo-substituted 2-(o-aminophenyl)-2,1,3-(4,5,6,7-tetrahydrobenzotriazole) is obtained.

Treatment of the above dibromo derivative or the dichloro derivative of Example II, below, with $Cu(CN)_2$ at a temperature of about 200° C. yields the corresponding dicyano derivative in each instance. Hydrolysis of the respective dicyano derivatives with aqueous hydrochloric acid readily yields the corresponding dicarboxy-substituted 2-(o-aminophenyl)-2,1,3-(4,5,6,7-tetrahydrobenzotriazole). Similar results will be obtained by following the same procedure when other halogen derivatives of 2-(o-aminophenyl)-2,1,3-(4,5,6,7-tetrahydrobenzotriazole) are employed.

In the right column of Table I are listed other products of this invention which are readily prepared by substituting the corresponding benzotriazole in the left column for 2-(o-aminophenyl)-2,1,3-benzotriazole in the procedure of Example I.

*Table I*

| Example | Compound Hydrogenated | Hydrogenation Product |
| --- | --- | --- |
| II | 2-(o-amino-p-chlorophenyl)-5(6?)-chloro-2,1,3-benzotriazole. | 2-(o-amino-p-chlorophenyl)-5(6?)-chloro-2,1,3-(4,5,6,7-tetrahydrobenzotriazole). |
| III | 2-(o-amino-m-carboxyphenyl)-2,1,3-benzotriazole. | 2-(o-amino-m-carboxyphenyl)-2,1,3-(4,5,6,7-tetrahydrobenzotriazole). |
| IV | 2-(o-amino-m-methylphenyl)-4-methyl-2,1,3-benzotriazole. | 2-(o-amino-m-methylphenyl)-4-methyl-2,1,3-(4,5,6,7-tetrahydrobenzotriazole). |
| V | 2-(o-amino-p-butylphenyl)-octadecyl-2,1,3-benzotriazole. | 2-(o-amino-p-butylphenyl)-octadecyl-2,1,3-(4,5,6,7-tetrahydrobenzotriazole). |
| VI | 2-(o-amino-m-ethoxyphenyl)-butoxy-2,1,3-benzotriazole. | 2-(o-amino-m-ethoxyphenyl)-butoxy-2,1,3-(4,5,6,7-tetrahydrobenzotriazole). |
| VII | 2-(o-aminoxylyl)-x,x-dimethyl-2,1,3-benzotriazole. | 2-(o-aminoxylyl)-x,x-dimethyl-2,1,3-(4,5,6,7-tetrahydrobenzotriazole). |
| VIII | 2-(o-amino-hexylphenyl)-2,1,3-benzotriazole. | 2-(o-amino-hexylphenyl)-2,1,3-(4,5,6,7-tetrahydrobenzotriazole). |
| IX | 2-(o-amino-m-sodiumsulfonatophenyl)-2,1,3-benzotriazole sodium sulfonate. | 2-(o-aminophenyl-m-sodiumsulfonatophenyl)-2,1,3-(4,5,6,7-tetrahydrobenzotriazole)sodium sulfonate.[1] |
| X | 2-[o-(2,1,3-benzotriazolyl)]-succinic acid anilide. | 2-[o-(2,1,3-[4,5,6,7-tetrahydrobenzotriazolyl)]] succinic acid anilide. |
| XI | 2-[o-(3,5-dicyano-1-benzamido)phenyl]-2,1,3-benzotriazole. | 2-[o-(3,5-dicyano-1-benzamido)-phenyl]-2,1,3-(4,5,6,7-tetrahydrobenzotriazole).[2] |
| XII | 2-(o-N-mono-ω-hydrooctafluorovalerylamidophenyl)-2,1,3-benzotriazole. | 2-(o-N-mono-ω-hydrooctafluorovalerylamidophenyl)-2,1,3-(4,5,6,7-tetrahydrobenzotriazole). |
| XIII | 2-(o-N-mono-ω-ethoxybutyrylamidophenyl)-2,1,3-benzotriazole. | 2-(o-N-mono-ω-ethoxybutyrylamidophenyl)-2,1,3-(4,5,6,7-tetrahydrobenzotriazole). |
| XIV | 2-(o-N-mono-ω-hydroxybutyrylamidophenyl)-2,1,3-benzotriazole. | 2-(o-N-mono-ω-hydroxybutyrylamidophenyl)-2,1,3-(4,5,6,7-tetrahydrobenzotriazole). |
| XV | 2-(o-N-monocamphoramidophenyl)-2,1,3-benzotriazole. | 2-(o-N-monocamphoramidophenyl)-2,1,3-(4,5,6,7-tetrahydrobenzotriazole). |
| XVI | 2-(o-aminonaphthyl)-2,1,3-benzotriazole. | 2-(o-N-aminonaphthyl)-2,1,3-(4,5,6,7-tetrahydrobenzotriazole). |

[1] Hydrolysis of this product with aqueous hydrochloric acid readily yields the corresponding sulfo-substituted tetrahydrobenzotriazole.
[2] Hydrolysis of this product with aqueous hydrochloric acid readily yields the corresponding carboxy-substituted tetrahydrobenzotriazole.

EXAMPLE XVII 2-(o-aminophenyl)-2,1,3-benzotriazole (31.5 g.) in 125 cc. of tetrahydrofuran and containing 300 mg. of $PtO_2$ and 500 mg. of 5% palladium-on-carbon is hydrogenated for six hours at 75° C. under a hydrogen pressure of 1000 lbs./sq. in. The reactor is thereafter allowed to cool, discharged, and the contents filtered to remove the catalyst. The filtrate is subjected to evaporation at reduced pressure to remove the tetrahydrofuran. The residue corresponds to a yield of 95%. Recrystallization from hexane gives the tetrahydro derivative, 2-(o-aminophenyl)-2,1,3-(4,5,6,7-tetrahydrobenzotriazole), M.P. 75–76° C. The infrared spectrum is identical to that from the product in Example I.

EXAMPLE XVIII

The 2-(o-aminophenyl)-2,1,3-(4,5,6,7-tetrahydrobenzotriazole), prepared as in Example I (150 mg.), is heated at 60–70° with an excess (1 g.) of acetic anhydride for 45 minutes and the reaction mixture is then poured into 25 ml. of water. After 30 minutes the colorless solid which forms is collected by filtration and dried. The infrared spectrum of the product is consistent with the structure of 2-(o-N-monoacetamidophenyl)-2,1,3-(4,5,6,7-tetrahydrobenzotriazole).

A solution of the amide obtained as above in N-ethylacetamide shows the following absorptions: 300 m$\mu$ ($\epsilon$ 6840), 287 m$\mu$ ($\epsilon$ 10,600), 277m$\mu$ ($\epsilon$ 12,100). The intensity of these absorptions remains unchanged after 80 hours' exposure of the solution in the Fade-Ometer.

EXAMPLE XIX

A mixture of 6 g. of 1,3a,4,6a-dibenzotetraazapentalene, 75 ml. of glacial acetic acid, and 5% palladium-on-carbon catalyst is hydrogenated at 100 lbs./sq. in. hydrogen pressure and 125° C. for three hours. The reaction mixture is filtered, evaporated to dryness, and the oily residue extracted with diethyl ether. After evaporation of the ethereal extract, the remaining oily residue is re-extracted with petroleum ether. This mixture is chromatographed on a commercial nonalkaline alumina[1], using diethyl ether as the developing solvent. Two fractions are isolated. The faster-moving fraction is unidentified; the slower-moving fraction is identified as 2-(o-N-monoacetamidophenyl)-2,1,3-(4,5,6,7-tetrahydrobenzotriazole), identical to the product of Example II, by chemical analysis, ultraviolet and infrared spectra.

EXAMPLE XX

To a mixture of 10.7 g. of 2-(o-aminophenyl)-2,1,3-(4,5,6,7-tetrahydrobenzotriazole) and 70 ml. of water is added at ambient temperature, in alternating portions, a total of 14 g. of benzoyl chloride and sufficient quantities of 20% aqueous sodium hydroxide to maintain alkalinity. The mixture is shaken vigorously during the addition, which requires nearly one hour. After an additional hour, the benzamido derivative is collected by filtration, washed well with distilled water, and recrystallized from 400 ml. of ethanol, after decolorizing with deactivated carbon. There is obtained 10.6 g. of colorless, hairlike needles, M.P. 146.5–147.5° C. The infrared spectrum of this compound shows the single N—H absorption and the amide C=O absorption, in accord with the structure of 2-(o-N-monobenzamidophenyl)-2,1,3-(4,5,6,7-tetrahydrobenzotriazole). The ultraviolet spectrum in ethanol shows absorptions at 300 m$\mu$ ($\epsilon$ 14,085), 265 m$\mu$ ($\epsilon$ 27,000), and 233 m$\mu$ ($\epsilon$ 14,850). On hydrolysis of the 2-(o-N-monobenzamidophenyl)-2,1,3-(4,5,6,7-tetrahydrobenzotriazole) by refluxing with concentrated hydrochloric acid and ethanol for two hours, the colorless 2-(o-aminophenyl)-2,1,3-(4,5,6,7-tetrahydrobenzotriazole) is recovered, M.P. 78.5–79.5 C.

*Analysis.*—Calcd. for $C_{19}H_{18}N_4O$: C, 71.68%; H, 5.70%; N, 17.60%. Found: C, 71.46%; H, 5.74%; N, 17.62%.

EXAMPLE XXI

To a solution of 5 g. of 2-(o-aminophenyl)-2,1,3-(4,5,6,7-tetrahydrobenzotriazole) in 100 ml. of methylene chloride is added at ambient temperature 3 g. of methane sulfonyl chloride, followed by triethylamine (3 g.). An exothermic reaction ensues. The clear solution is stirred at room temperature overnight, decolorized with activated carbon, and then shaken with water to remove any amine

[1] This is a product of M. Woelm-Eschwege, Germany.

salts. The organic layer is dried over anhydrous magnesium sulfate and evaporated to dryness. The residue is recrystallized successively from 3:1 ethanol-water, aqueous acetic acid, and ethanol. The 2-(o-N-methanesulfonamidophenyl) - 2,1,3 - (4,5,6,7-tetrahydrobenzotriazole) is obtained as colorless crystals, M.P. 101.8–103.2° C.

*Analysis.*—Calcd. for $C_{13}H_{16}N_4O_2S$: C, 53.41%; H, 5.52%; N, 19.17%. Found: C, 52.31%; H, 5.21%; N, 19.31%.

The infrared spectrum is consistent with the structure 2-(o - N - methanesulfonamidophenyl)-2,1,3-(4,5,6,7-tetrahydrobenzotriazole.

EXAMPLE XXII

A solution of 1.0 g. of 2-(o-aminophenyl)-2,1,3-(4,5,6,7-tetrahydrobenzotriazole) in 15 ml. of tetrahydrofuran containing 0.6 g. of triethylamine is treated with acryloyl chloride (0.5 g.) in 3 ml. of tetrahydrofuran. The mixture is stirred at room temperature for four hours, concentrated, and poured into ice water. The solid which forms is collected by filtration and recrystallized from alcohol-water. The colorless acrylamide product obtained melts at 88.8° to 89.6° C. and analyzes:

*Analysis.*—Calcd. for $C_{15}H_{16}N_4O$: C, 67.15%; H, 6.01%; N, 20.89%. Found: C, 67.45%; H, 6:30%; N, 20.35%.

EXAMPLE XXIII

To 20 ml. of trifluoroacetic anhydride is gradually added 5 g. of 2-(o-aminophenyl)-2,1,3-(4,5,6,7-tetrahydrobenzotriazole). After several minutes, a mass of solid separates. When all of the amino compound has been added, one volume of trifluoroacetic acid is added to give a homogeneous solution. The reaction mixture is stirred at ambient temperature for an hour, then poured into four volumes of ice-water to obtain a colorless solid. Recrystallization from methanol yields white, well-defined crystals (5.25 g.) which melt at 105.2–106.0° C. Dilution of the mother liquor with water yields an additional 1.15 g. of product, 2-(o-N-monotrifluoroacetamidophenyl) - 2,1,3-(4,5,6,7-tetrahydrobenzotriazole). The infrared spectrum shows the presence of the NH and CO of the amide as well as the —$CF_3$ absorption.

*Analysis.*—Calcd. $C_{14}H_{13}N_4F_3O$: C, 54.19%; H, 4.22%; N, 18.06%. Found: C, 53.04%; H, 4:12%; N, 18.29%.

No loss is observed in the absorption maximum (285 m$\mu$, $\epsilon$ 19,300) after an n-propyl acetate solution of the product has been exposed in the Fade-Ometer for 80 hours.

The products of the invention listed in the right column of Table II are readily prepared by reacting the compounds in the left column with the acylating agents listed in the middle column following conventional procedures, e.g. those used in Example XVIII and XX–XXIII.

*Table II*

| Example | Compounds acylated | Acylating Agent | Acylation Product |
| --- | --- | --- | --- |
| XXIV | 2-(o-aminophenyl)-2,1,3-(4,5,6,7-tetrahydrobenzotriazole). | 2-methyl-4-chloro-benzoyl chloride. | 2-(o-N-mono-2-methyl-4-chlorobenzamidophenyl)-2,1,3-(4,5,6,7-tetrahydrobenzotriazole). |
| XXV | 2-(o-amino-p-chlorophenyl)-5 (6?)-chloro-2,1,3-(4,5,6,7-tetrahydrobenzotriazole). | ethanesulfonyl chloride. | 2-(o-N-monethanesulfonamido-p-chlorophenyl)-5(6?)-chloro-2,1,3-(4,5,6,7-tetrahydrobenzotriazole). |
| XXVI | 2-(o-aminotolyl)ethyl-2,1,3-(4,5,6,7-tetrahydrobenzotriazole). | dodecanoic acid bromide. | 2-(o-N-monododecanamidotolyl)ethyl-2,1,3-(4,5,6,7-tetrahyrobenzotriazole). |
| XXVII | 2-(o-amino-n-ethoxy-phenyl) butoxy-2,1,3-(4,5,6,7-tetrahydrobenzotriazole). | pyridine-3-carboxylic acid. | 2-(o-N-monopyridin-3-amido-m-ethoxyphenyl)-butoxy-2,1,3-(4,5,6,7-tetrahydrobenzotriazole). |
| XXVIII | 2-(o-aminophenyl)-2,1,3-(4,5,6,7-tetrahydrobenzotriazole). | quinoline-4-carboxylic acid. | 2-(o-N-monoquinolin-4-amidophenyl)-2,1,3-(4,5,6,7-tetrahydrobenzotriazole). |
| XXIX | 2-(o-aminophenyl)-2,1,3-(4,5,6,7-tetrahydrobenzotrizole. | 1-naphthoyl chloride. | 2-(o-N-mononaphth-1-amidophenyl)-2,1,3-(4,5,6,7-tetrahydrobenzotriazole). |
| XXX | 2-(o-aminophenyl)-2,1,3-(4,5,6,7-tetrahydrobenzotriazole). | terephthaloyl chloride. | bis[2-(o-terephthalamidophenyl)-2,1,3-(4,5,6,7-tetrahydrobenzotriazole)]*. |
| XXXI | 2-(o-aminophenyl)-2,1,3-4-5-6-7-tetrahydrobenzotriazole). | sebacoyl chloride. | bis[2-(o-sebacamidophenyl)-2-1-3-(4-5-6-7-tetrahydrobenzotriazole)]*. |
| XXXII | 2-(o-aminophenyl)-2,1,3-(4,5,6,7-tetrahydrobenzotriazole). | hexahydrobenzoyl chloride. | 2-(o-N-monohexahydrobenzamidophenyl)-2,1,3-(4,5,6,7-tetrahydrobenzotriazole). |
| XXXIII | 2-(o-aminophenyl)-2,1,3-(4,5,6,7-tetrahydrobenzotriazole). | stearoyl chloride. | 2-(o-N-monostearamidophenyl)-2,1,3-(4,5,6,7-tetrahydrobenzotriazole). |
| XXXIV | 2-(o-aminophenyl)-2,1,3-(4,5,6,7-tetrahydrobenzotriazole). | p-anisoyl chloride. | 2-(o-N-monoanisamidophenyl)-2,1,3-(4,5,6,7-tetrahydrobenzotriazole). |
| XXXV | 2-(o-aminophenyl)-2,1,3-(4,5,6,7-tetrahydrobenzotriazole). | o-xylyl sulfonyl chloride. | 2-(o-N-mono-2,3-dimethylnbenzenesulfonamidophenyl)-2,1,3-(4,5,6,7-tetrahydrobenzotriazole). |
| XXXVI | 2-(o-aminophenyl)-2,1,3-(4,5,6,7-tetrahydrobenzotriazole). | 3,5-dinitrobenzoyl chloride. | 2-(o-N-mono-3,5-dinitrobenzamidophenyl)-2,1,3-(4,5,6,7 tetrahydrobenzotriazole). |
| XXXVII | 2-(o-aminophenyl)-2,1,3-(4,5,6,7-tetrahydrobenzotriazole). | p-toluenesulfonyl chloride. | 2-(o-N-mono-p-toluenesulfonamidophenyl)-2,1,3-(4,5,6,7-tetrahydrobenzotriazole). |
| XXXVIII | 2-(o-aminophenyl)-2,1,3-(4,5,6,7-tetrahydrobenzotriazole. | cinnamoyl chloride. | 2-(o-N-monocinnamamidophenyl)-2,1,3-(4,5,6,7-tetrahydrobenzotriazole). |
| XXXIX | 2-(o-aminophenyl)-2,1,3-(4,5,6,7-tetra-hydrobenzotriazole). | phenacetyl chloride. | 2-(o-N-monophenacetamidophenyl)-2,1,3(4,5,6,7-tetrahydrobenzotriazole). |
| XL | 2-(o-aminophenyl)-2,1,3-(4,5,6,7-tetrahydrobenzotriazole). | methacrylyl chloride. | 2-(o-N-monomethacrylamidophenyl)-2,1,3-(4,5,6,7-tetrahydrobenzotriazole). |
| XLI | 2-(o-aminophenyl)-2,1,3-(4,5,6,7-tetrahydrobenzotriazole). | 2-furoyl chloride. | 2-(o-N-monofuramidophenyl)-2,1,3-(4,5,6,7-tetrahydrobenzotriazole). |
| XLII | 2-(o-aminophenyl)-2,1,3-(4,5,6,7-tetrahydrobenzotriazole). | ethyloxalyl chloride. | 2-(o-N-monoethyloxamidophenyl)-2,1,3-(4,5,6,7-tetrahydrobenzotriazole). |

See footnotes at end of table.

| Example | Compounds acylated | Acylating Agent | Acylation Product |
|---|---|---|---|
| XLIII | 2-(o-aminophenyl)-2,1,3-(4,5,6,7-tetrahydrobenzotriazole. | p-tert.-butyl-benzoic acid | 2-(o-N-mono-p-tert. butyl-benzamidophenyl)-2,1,3-(4,5,6,7-tetrahydrobenzotriazole). |
| XLIV | 2-(o-aminophenyl)-2,1,3-(4,5,6,7-tetrahydrobenzotriazole. | methanephosphonyl chloride. | 2-(o-N-monomethanephosphonamidophenyl)-2,1,3-(4,5,6,7-tetrahydrobenzotriazole). |
| XLV | 2-(o-aminophenyl)-2,1,3-(4,5,6,7-tetrahydrobenzotriazole). | butanephosphonyl chloride | 2-(o-N-monobutane-phosphonamidophenyl)-2,1,3-(4,5,6,7-tetra-hydrobenzotriazole). |
| XLVI | 2-(o-aminophenyl)-2,1,3-(4,5,6,7-tetrahydrobenzotriazole). | methylhexanephosphonyl chloride. | 2-(o-N-monomethylhexanephosphonamidophenyl)-2,1,3-(4,5,6,7-tetrahydrobenzotriazole). |

*Two equivalent portions of acylating agent are used to obtain the products of Examples XXX and XXXI. When these examples are repeated using one equivalent of acylating agent in each instance, 2-(o-N-monoterephthalamidophenyl)-and 2-(o-N-monosebacamidophenyl)-2,1,3-(4,5,6,7-tetrahydrobenzotriazole), respectively, are obtained. Esterification of the carboxyl group in each of these products with an alkanol, e.g., ethanol, butanol or hexanol, will yield the corresponding ester of this invention.

As was stated hereinabove, the new compounds of this invention are of the formula:

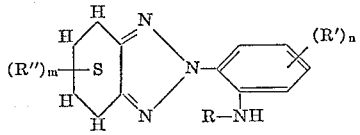

The preferred R' and R" groups are chlorine, bromine, sulfo, $SO_3Na$, nitro, carboxy, cyano, lower alkyl (1 through 7 carbons) and lower alkoxy (1 through 7 carbons). Butadienylene (the divalent radical which forms an extended aromatic structure with the 2-aryl ring) is an additional preferred R' group. The electronegative R' and R" groups are particularly preferred. Generally $m$ and $n$ will not exceed 2 and preferably both $m$ and $n$ are 0.

Because the acylating agents necessary to prepare them are more readily available, the preferred acyl derivatives of the 2-(o-aminophenyl)-2,1,3,-(4,5,6,7-tetrahydrobenzotriazoles) are the 2-(o-carbonamidophenyl)-and 2-(o-sulfonamidophenyl) - 2,1,3 - (4,5,6,7 - tetrahydrobenzotriazoles) wherein the organic moiety attached to the

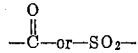

group is alkyl, alkenyl, unsubstituted aryl (aromatic hydrocarbon) of 6–10 ring carbons, cycloalkyl of 5–8 ring carbons; alkaryl, aralkyl or aralkenyl, wherein the aryl moiety is aromatic hydrocarbon and contains 6–10 ring carbons; halogen-substituted alkyl or aromatic hydrocarbon groups of 6–10 ring carbons, wherein all halogen atoms are of atomic number 9–35; loweralkoxyalkyl or loweralkoxyaryl wherein the aromatic ring is otherwise unsubstituted and contains 6–10 ring carbons; or a heterocyclic group of up to 14 carbons having 4–9 ring carbons and at most one hetero atom which is either oxygen or nitrogen; and in addition, the carbonamide derivatives wherein the acyl group is loweralkoxyoxalyl;

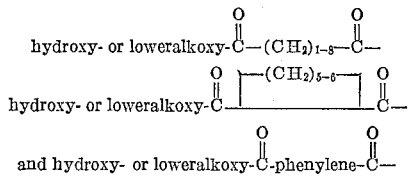

and the phosphonic acid amides wherein the acyl moiety is a loweralkylphosphonyl group.

Of the above acyl derivatives, those prepared from acylating agents wherein the organic group bonded to the acidic moiety is composed solely of carbon and hydrogen atoms are most accessible and to this extent most preferred.

The 2 - (o-N-carbonamidophenyl)-2,1,3-(4,5,6,7,-tetrahydrobenzotriazoles) and the 2-(o-N-sulfonamidophenyl)-2,1,3 - (4,5,6,7 - tetrahydrobenzotriazoles), particularly those wherein the acyl group is of the formula, $R^1CO-$ or $R^2SO_2-$, $R^1$ being a monoethylenically unsaturated acyclic hydrocarbon group of no more than 7 carbon atoms, and $R^2$ being alkyl, especially alkyl of no more than 7 carbon atoms, constitute a preferred class because of their superior photostabilizing properties. Of special interest are the carbonamides in which the acyl group is derived from an alpha, beta-ethylenically unsaturated carboxylic acid of no more than 7 carbon atoms because they can easily be homopolymerized, or copolymerized with other monomers, to form compositions which can be converted to fibers, films, filaments, and the like of lasting actinic light resistance.

The most preferred individual compound is 2-(o-aminophenyl)-2,1,3-(4,5,6,7-tetrahydrobenzotriazole because it is the parent of many of the compounds of this invention and because of its outstanding photostabilizing properties.

To test the efficiency of the 2-(o-aminophenyl)-2,1,3-(4,5,6,7-tetrahydrobenzotriazoles) as light stabilizers, two samples of nylon polymer were prepared. To one sample, 1% by weight of the 2-(o-aminophenyl)-2,1,3-(4,5,6,7-tetrahydrobenzotriazole) was added and none was added to the second sample. Each sample was spun to yarn. The samples were then dyed and evaluated for lightfastness. The results are shown below.

FABRICS

| Dye | Class | Hours to 1st Break in Xenon Light | |
|---|---|---|---|
| | | TAPB* | Control |
| Anthraquinone Violet 3RN | Acid | 20–40 | 20.0 |
| Acetamine Orange R | Dispersed | 40 | 20.0 |

FILM

| | | | |
|---|---|---|---|
| Anthraquinone Violet 3RN | Acid | ca. 80.0 | 20.0 |
| Pontacyl Carmine 2G | Acid | 5–10 | 5.0 |

*2-(o-aminophenyl)-2,1,3-(4,5,6,7-tetrahydrobenzotriazole).

The above-described undyed films and fabrics showed no yellow discoloration, in contrast to films and fabrics containing the unhydrogenated benzotriazole, 2-(o-aminophenyl)-2-1,3,-benzotriazole.

2 - (o-N-methanesulfonamidophenyl) - 2,1,3 - (4,5,6,7-tetrahydrobenzotriazole was added at the 5% (by weight) level to a polyvinyl dioxolane solution. Actinic light-opaque films were then cast on glass (approximately 2.4 mil thickness). The tetrahydrobenzotriazole was found to be compatible in this polymer medium. Furthermore, the material did not cause significant retardation in the air-drying time of the film, a highly desirable feature.

Since obvious modifications and equivalents in the invention will be evident to those skilled in the chemical arts, I propose to be bound solely by the appended claims.

The embodiments of the invention in which an exclusive property or privilege is claimed are defined as follows:

1. A compound of the formula:

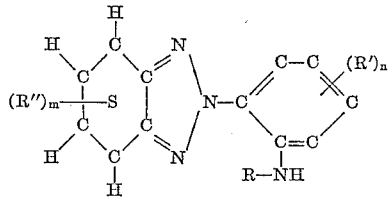

wherein R is selected from the class consisting of hydrogen and an acyl group free of acetylenic unsaturation; R″ contains less than 19 carbons and is selected from the group consisting of alkyl, alkoxy, halogen of atomic number 9–35, nitro, sulfo, —$SO_3$ alkali metal, cyano and carboxy; R′ contains less than 19 carbons and is selected from the group consisting of R″ and an alkenylene group which forms an extended aromatic structure of up to 14 ring carbons with the aromatic ring to which it is attached; and each of $m$ and $n$ is a cardinal number less than 5.

2. 2-(o-N-$R^2SO_2$NH-phenyl) - 2,1,3 - (4,5,6,7 - tetrahydrobenzotriazole), wherein $R^2$ is free of acetylenic unsaturation and is hydrocarbon of less than 19 carbons.

3. A compound of claim 2 wherein $R^2$ is alkyl of up to 7 carbons.

4. 2-(o-N-$R^1$C(O)NH-phenyl)-2,1,3-(4,5,6,7 - tetrahydrobenzotriazole), wherein $R^1$ is free of acetylenic unsaturation and is hydrocarbon of less than 19 carbons.

5. A compound of claim 4 wherein $R^1$ is monoethylenically unsaturated acyclic hydrocarbon of up to 7 carbons.

6. 2-(o-aminophenyl)-2,1,3-(4,5,6,7 - tetrahydrobenzotriazole).

7. 2-(o-N-monoacetamidophenyl) - 2,1,3-(4,5,6,7-tetrahydrobenzotriazole).

8. 2-(o-N-monobenzamidophenyl)-2,1,3-(4,5,6,7-tetrahydrobenzotriazole).

9. 2-(o-N-monoacrylamidophenyl)-2,1,3-(4,5,6,7-tetrahydrobenzotriazole).

10. 2-(o-N - monomethanesulfonamidophenyl) - 2,1,3-(4,5,6,7-tetrahydrobenzotriazole).

References Cited by the Examiner

UNITED STATES PATENTS

| 2,362,988 | 11/44 | Conzetti et al. | 260—308 |
| 3,074,910 | 1/63 | Dickson | 260—45.8 |
| 3,076,782 | 2/63 | Mohr et al. | 260—45.8 |
| 3,084,151 | 4/63 | Gross et al. | 260—146 |

FOREIGN PATENTS

| 878,363 | 9/61 | Great Britain. |

NICHOLAS S. RIZZO, *Primary Examiner.*

LEON J. BERCOVITZ, *Examiner.*